United States Patent
Alcalde et al.

(10) Patent No.: US 10,481,243 B2
(45) Date of Patent: Nov. 19, 2019

(54) AUTOMATED VEHICLE RADAR SYSTEM WITH SELF-CALIBRATION

(71) Applicant: Aptiv Technologies Limited, St. Michael (BB)

(72) Inventors: Carlos Alcalde, Beverly Hills, CA (US); Duc H. Vu, Camarillo, CA (US)

(73) Assignee: APTIV TECHNOLOGIES LIMITED (BB)

( * ) Notice: Subject to any disclaimer, the term of this patent is extended or adjusted under 35 U.S.C. 154(b) by 328 days.

(21) Appl. No.: 15/339,135

(22) Filed: Oct. 31, 2016

(65) Prior Publication Data

US 2018/0120414 A1 May 3, 2018

(51) Int. Cl.
| | |
|---|---|
| *G01S 7/40* | (2006.01) |
| *G01S 13/93* | (2006.01) |
| *G01S 13/42* | (2006.01) |
| *G01S 13/64* | (2006.01) |
| *G01S 7/41* | (2006.01) |
| *G01S 13/58* | (2006.01) |

(52) U.S. Cl.
CPC .......... *G01S 7/4004* (2013.01); *G01S 7/4026* (2013.01); *G01S 7/415* (2013.01); *G01S 13/42* (2013.01); *G01S 13/58* (2013.01); *G01S 13/589* (2013.01); *G01S 13/64* (2013.01); *G01S 13/931* (2013.01); *G01S 2007/403* (2013.01); *G01S 2007/4091* (2013.01); *G01S 2013/9353* (2013.01); *G01S 2013/9375* (2013.01)

(58) Field of Classification Search
CPC .. G01S 7/40–4026; G01S 7/415; G01S 13/42; G01S 13/64; G01S 13/589; G01S 13/58; G01S 13/931; G01S 2013/9375; G01S 2007/4091; G01S 2013/9353; G01S 2007/403

See application file for complete search history.

(56) References Cited

U.S. PATENT DOCUMENTS

| | | | |
|---|---|---|---|
| 5,832,407 A | 11/1998 | Kai et al. | |
| 5,964,822 A * | 10/1999 | Alland | G01S 7/4004 342/90 |

(Continued)

FOREIGN PATENT DOCUMENTS

JP    2002 228749 A    8/2002

*Primary Examiner* — Matthew M Barker
(74) *Attorney, Agent, or Firm* — Joseph V. Bonadies

(57) ABSTRACT

An automated vehicle radar system capable of self-calibration includes an antenna, a transceiver, and a controller. The antenna broadcasts a radar-signal and detects a reflected-signal reflected by an object. The transceiver determines a distance, an angle, and a range-rate of the object relative to the antenna based on the radar-signal and the reflected-signal. The controller determines a speed of a host-vehicle; determines when the object is stationary based on the speed, the angle, and the range-rate; stores in a memory a plurality of detections that correspond to multiple instances of the distance, the angle, and the range-rate as the host-vehicle travels by the object; selects an ideal-response of angle versus range-rate based on the speed; determines a calibration-matrix of the system based on a difference between the plurality of detections and the ideal-response; and adjusts an indicated-angle to a subsequent-object in accordance with the calibration-matrix.

20 Claims, 4 Drawing Sheets

TIME A

TIME B

(56) References Cited

U.S. PATENT DOCUMENTS

| | | | |
|---|---|---|---|
| 6,202,027 B1 * | 3/2001 | Alland | G01S 7/4004 340/435 |
| 6,900,755 B2 * | 5/2005 | Richardson | B60K 31/0008 342/104 |
| 8,589,116 B2 * | 11/2013 | Jordan | G01S 13/931 33/533 |
| 8,930,063 B2 * | 1/2015 | Gandhi | B60R 16/02 180/128 |
| 9,500,742 B2 * | 11/2016 | Poiger | G01S 7/4026 |
| 9,776,629 B2 * | 10/2017 | Heinrichs-Bartscher | B60W 30/08 |
| 10,024,955 B2 * | 7/2018 | Song | G01S 7/4004 |
| 10,088,553 B2 * | 10/2018 | Zeng | B60W 40/105 |
| 2007/0115169 A1 | 5/2007 | Kai et al. | |
| 2008/0012752 A1 | 1/2008 | Okamura et al. | |
| 2015/0276923 A1 | 10/2015 | Song et al. | |
| 2015/0323651 A1 * | 11/2015 | Poiger | G01S 7/4026 342/113 |
| 2016/0209211 A1 * | 7/2016 | Song | G01B 21/24 |

* cited by examiner

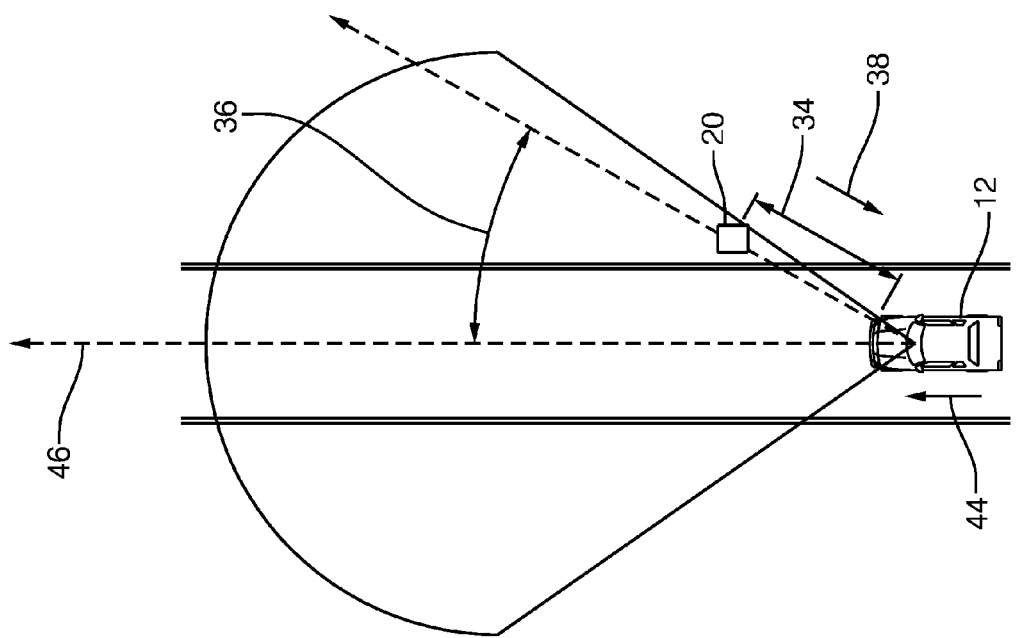
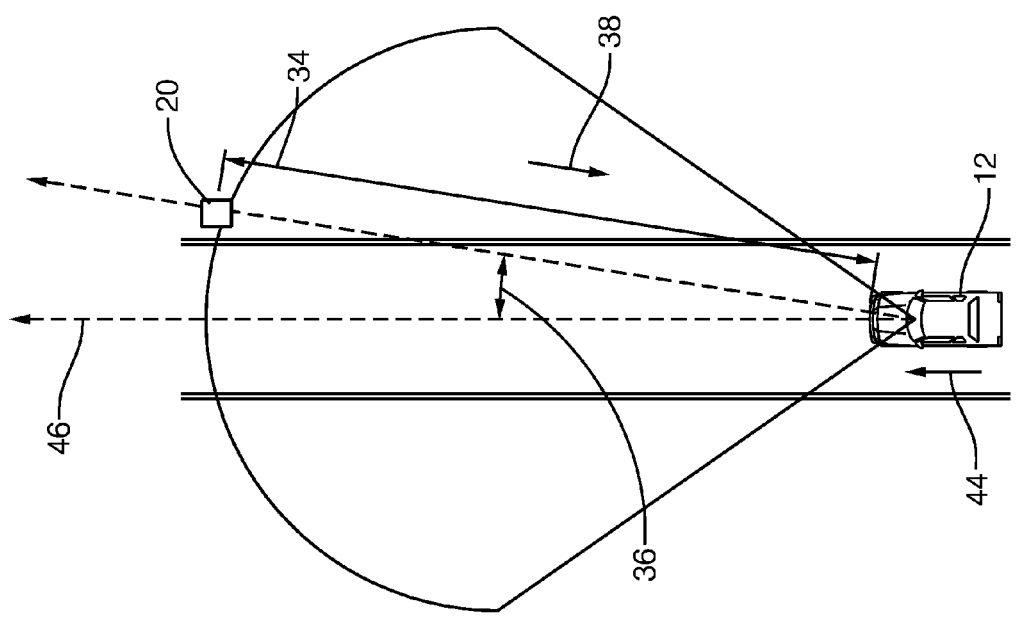

AUTOMATED VEHICLE RADAR SYSTEM WITH SELF-CALIBRATION

TECHNICAL FIELD OF INVENTION

This disclosure generally relates to an automated vehicle radar system, and more particularly relates to a radar system that self-calibrates as a host-vehicle travels past a stationary object.

BACKGROUND OF INVENTION

Automotive radar systems are often initially calibrated in a test facility such as an anechoic chamber, and then installed on a host-vehicle without further re-calibration. As such, the calibration may not be optimal as the calibration does not compensate for the effects of the fascia, frame, or other features of the host-vehicle that may influence the response of the radar system. Also, this initial calibration does not compensate for changes of response due to aging or changes in environmental conditions, which can and often do lead to deterioration in system performance. A typical initial calibration of the radar system prior to installation in a host-vehicle places a target at a reference point in the chamber, and the radar antenna is rotated so a response is collected over a set of angles that correspond to the radar system's operating field-of-view. At each angle, a response in the form of complex voltages is collected for each element of the antenna, and these responses can be used to fully determine a default or initial calibration of the system. That is, where the responses deviate from an expected or ideal-response is noted and a correction factor or calibration-matrix is established to correct or compensate the complex-voltages from each element of the antenna for each of the angles tested.

SUMMARY OF THE INVENTION

Described herein is a radar system that is programmed with a method for on-line or on-the-fly calibration of an automotive radar system, where the calibration does not rely on a controlled chamber environment or predetermined test facility. The calibration can be performed while the host-vehicle is traveling throughout the operating lifetime of the system. This provides for a more precise calibration of the system even as parts of the system or the host-vehicle change (e.g. degrade) over time and/or due to changes in operating environment. The system uses the premise that a response from a single target can be found for multiple angles as the host-vehicle travels past the target. The method includes procedures for picking out such targets and updating/tuning a calibration-matrix that provides for a full calibration of the system. The method make use of a Doppler scattering phenomenon where a stationary object takes on different Doppler value due to the changing radial speed as the host-vehicle makes it way toward and eventually past the stationary object, where the radial speed is dependent on the speed of the host-vehicle and the angle to the object. The range of physical angles of the stationary object depends on its relative position with respect to the host-vehicle, which is tied to the initial range. There may be a one-to-one mapping between a certain Doppler value and physical angle of the stationary object. For a forward facing radar, the stationary object of interest initially may be located at one degree (1°) offset from the bore-site of the system. As long as the host-vehicle has a fixed trajectory (driving at a constant speed on a relative straight roadway) a stationary object such as a light pole, or speed limit sign can be tracked and the data can be stored and later used for calibration.

At certain intervals determined at the time of the design, the radar goes into an on-line calibration mode. This can be based on miles traveled, weather changes, a time-interval (periodic), or a time-delta from the initial time of sensor operation. In the calibration mode, the system may be switched into a sensing mode which gives it the highest Doppler resolution that is appropriate with the vehicle speed. For example, the system may be configured to gather separate detections of the object at the one degree angular intervals. For example, if the host-vehicle traveling at 60 kph and the object is at an angle of one degree (the most stressing), the system needs at least a 2.5 mm/s Doppler resolution to be able to determine that the object is at the 1 degree location. However, when the object is at the 40 degrees, the Doppler resolution only needs to be 185 mm/s. detection range is limited to 5-40 degrees instead of 1-40 degrees; the minimum Doppler resolution requirements can be relaxed.

After setting the parameters of the sensing mode based on the speed of the host-vehicle, the field-of-view of the system may be searched for dominant stationary object. The object is then tracked and complex voltages recorded at, for example, one-degree angle intervals, and continue until the object exits the field-of-view of the system, for example at forty-five degrees. It is noted that the collection of data does not need to be complete for every degree of angle in the field-of-view, but the more complete the collection, the more exact the calibration would become.

In accordance with one embodiment, a radar system suitable for use on an automated vehicle and capable of self-calibration is provided. The system includes an antenna, a transceiver, and a controller. The antenna is mounted on a host-vehicle. The antenna is used to broadcast a radar-signal and detect a reflected-signal arising from a reflection of the radar-signal by an object. The transceiver is in communication with the antenna. The transceiver determines a distance, an angle, and a range-rate of the object relative to the antenna based on the radar-signal and the reflected-signal. The controller is in communication with the transceiver. The controller determines a speed of the host-vehicle; determines when the object is stationary based on the speed, the angle, and the range-rate; stores in a memory a plurality of detections that correspond to multiple instances of the distance, the angle, and the range-rate as the host-vehicle travels by the object; selects an ideal-response of angle versus range-rate based on the speed; determines a calibration-matrix of the system based on a difference between the plurality of detections and the ideal-response when the object is stationary; and adjusts an indicated-angle to a subsequent-object in accordance with the calibration-matrix.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIGS. 2A and 2B is an illustration of the relative locations of a host-vehicle equipped with the system of FIG. 1 and a stationary object detected by the system of FIG. 1 a two different instance in time in accordance with one embodiment.

DETAILED DESCRIPTION

Figure 1:
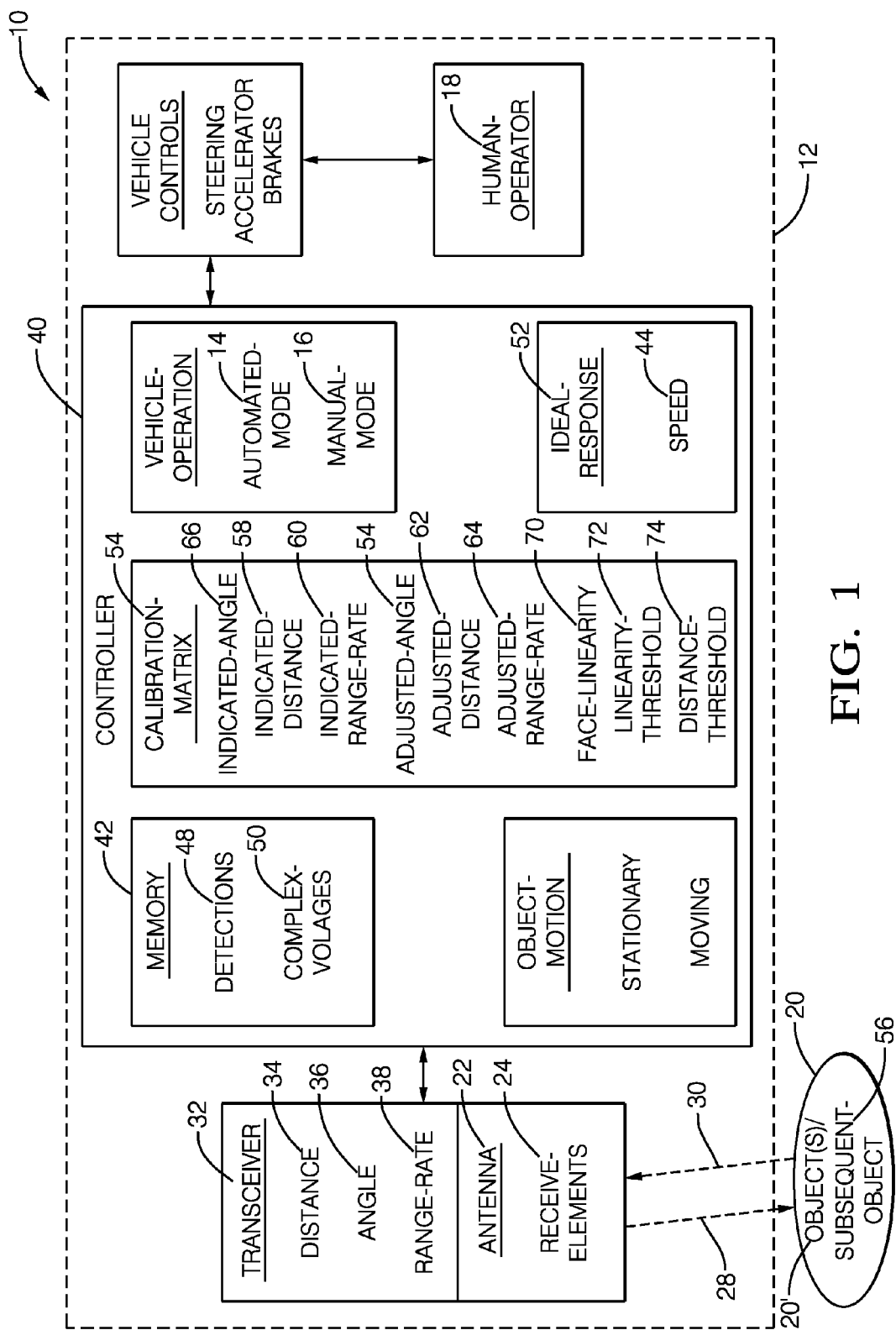
FIG. 1 is a diagram of a radar system in accordance with one embodiment.

FIG. 1 illustrates a non-limiting example of a radar system 10, hereafter referred to as the system 10. The system 10 is suitable for use an automated vehicle, e.g. a host-vehicle 12. As used herein, the term automated vehicle applies to instances when the host-vehicle 12 is being operated in an automated-mode 14, i.e. a fully autonomous mode, where a human-operator 18 of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator 18 who is generally in control of the steering, accelerator, and brakes of the host-vehicle 12. For example, the system 10 may merely assist the human-operator 18 as needed to change lanes and/or avoid interference with and/or a collision with, for example, an object 20 such as an other-vehicle or a road sign.

The system 10 described herein is advantageously capable of self-calibration to overcome the problems described above with regard to the one-time initial calibration. As will be described in more detail below, the system 10 described herein is able to use detected instances of stationary objects (e.g. road-signs or instances of reflectors mounted on posts commonly used to indicate the edge of a roadway) to periodically, regularly, or continuously update or refine the calibration of the system 10.

The system 10 includes an antenna 22 mounted on a host-vehicle 12. In general, the antenna 22 has multiple instances of receive-elements 24 (FIG. 4) so an azimuth angle to the object 20 can be determined, as will be recognized by those in the art. The antenna 22 may be a single unified unit built on a single substrate 26, or the antenna 22 may have elements distributed at different spaced apart locations on the host-vehicle 12. The antenna 22 may include one or more separate elements (not shown) used to broadcast a radar-signal 28, or one or more of the receive-elements 24 may be multiplexed to broadcast the radar-signal 28 and detect a reflected-signal 30 arising from a reflection of the radar-signal 28 by the object 20.

The system 10 includes a transceiver 32 in communication with the antenna 22. The communication may be by way of wires, fiber-optics, wave-guides, and the like, or any combination thereof, as will be recognized by those in the art. The transceiver 32 may be used to determine a distance 34, an angle 36 (i.e. the aforementioned azimuth angle), and a range-rate 38 (see also FIGS. 2A and 2B) of the object 20 relative to the host-vehicle 12, or more specifically the antenna 22, based on the radar-signal 28 and the reflected-signal 30.

The system 10 includes a controller 40 in communication with the transceiver 32. While the transceiver 32 is shown as separate from the controller 40, this is only to simplify the explanation of the system 10. It is contemplated that the function of the transceiver 32 could be integrated into the controller 40. The controller 40 may include a processor (not specifically shown) such as a microprocessor or other control circuitry such as analog and/or digital control circuitry including an application specific integrated circuit (ASIC) for processing data as should be evident to those in the art. The controller 40 may include memory 42, including non-volatile memory, such as electrically erasable programmable read-only memory (EEPROM) for storing one or more routines, thresholds, and captured data. The one or more routines may be executed by the processor to perform a method of steps for calibrating the system 10 based on signals sent and received by the controller 40 as described herein. That is, the controller 40 can be described as being programmed to perform the method described below to calibrate the system 10.

In one step the controller 40 determines a speed 44 of the host-vehicle 12. The speed 44 may be determined in a number of ways including, but not limited to, receiving a signal from a rotational-speed sensor (e.g. wheel speed sensor) where the signal may also be used to operate a speedometer of the host-vehicle; receiving a speed-value from a global-positioning-system (GPS) of the host-vehicle 12; or collecting/averaging range-rates associated with stationary-objects located near the bore-site 46 (FIGS. 2A and 2B) of the system 10.

In another step the controller 40 determines when the object 20 is stationary based on the speed 44, the angle 36, and the range-rate 38. If the range-rate 38 divided by the cosine of the angle 36 is approximately equal to the speed 44, e.g. +/−2%, then the object 20 is presumed to be stationary. If the object 20 is not stationary, it is recognized that the object 20 could be tracked and used to calibrate the system 10. However, it is believed that the complexity and possible lower confidence of using moving objects with unknown and inconsistent speeds to calibrate the system 10 is not preferred as it is presumed that there will be a sufficient number of stationary objects to make the calibration of the system 10 effective. It is recognized that other characteristics (other than being stationary) of the reflected-signal 30 reflected by the object 20 may be examined to determine if the object 20 is suitable to use for calibrating the system 10, some of which will be described later.

FIGS. 2A and 2B illustrate a non-limiting example of a scenario where the object 20 is located adjacent to a roadway or lane traveled by the host-vehicle 12. FIG. 2A shows the relative locations of the object 20 and the host-vehicle 12 at Time A. The object 20 is relatively distant so the angle 36 is relatively small. As such, the range-rate 38 will be relatively similar to the speed 44. In FIG. 2B at a later time (Time B is after Time A) the object 20 is closer so the angle 36 is greater so the range-rate 38 will have decreased relative to the speed 44. FIGS. 2A and 2B illustrate how the range-rate 38 can vary as the host-vehicle travels at a constant speed past the object 20.

Referring again to the method or programming of the controller 40, in another step the controller 40 stores in the memory 42 a plurality of detections 48 that may be in the form of complex-voltages 50 from the receive-elements 24. In general, the complex-voltages 50 correspond to or are indicative of multiple instances of the distance 34, the angle 36, and the range-rate 38 as the host-vehicle 12 travels by the object 20. As a generic mathematical description for an antenna with N instances of the receive-elements 24 (N=8 for the example antenna shown in FIG. 4) and the number of detections corresponding to M angles where detections are collected, the data can be assembled it into an N×M matrix, which is shown below as Eq. 1.

$$X = \begin{bmatrix} x_{11} & \cdots & x_{1M} \\ \vdots & \ddots & \vdots \\ x_{N1} & \cdots & x_{NM} \end{bmatrix}. \quad \text{Eq. 1}$$

While the description so far may be interpreted to suggest that the plurality of detections 48 used to determine the X matrix shown in FIG. 1 are associated with a single instance of the object 20, this is not a requirement. That is, the plurality of detections 48 may include complex-voltages associated with instances of the distance 34, the angle 36, and the range-rate 38 from a plurality of objects 20'. By way of example and not limitation, the X matrix may include detections from multiple instances of reflectors mounted on posts commonly used to indicate the edge of a roadway.

Figure 3:
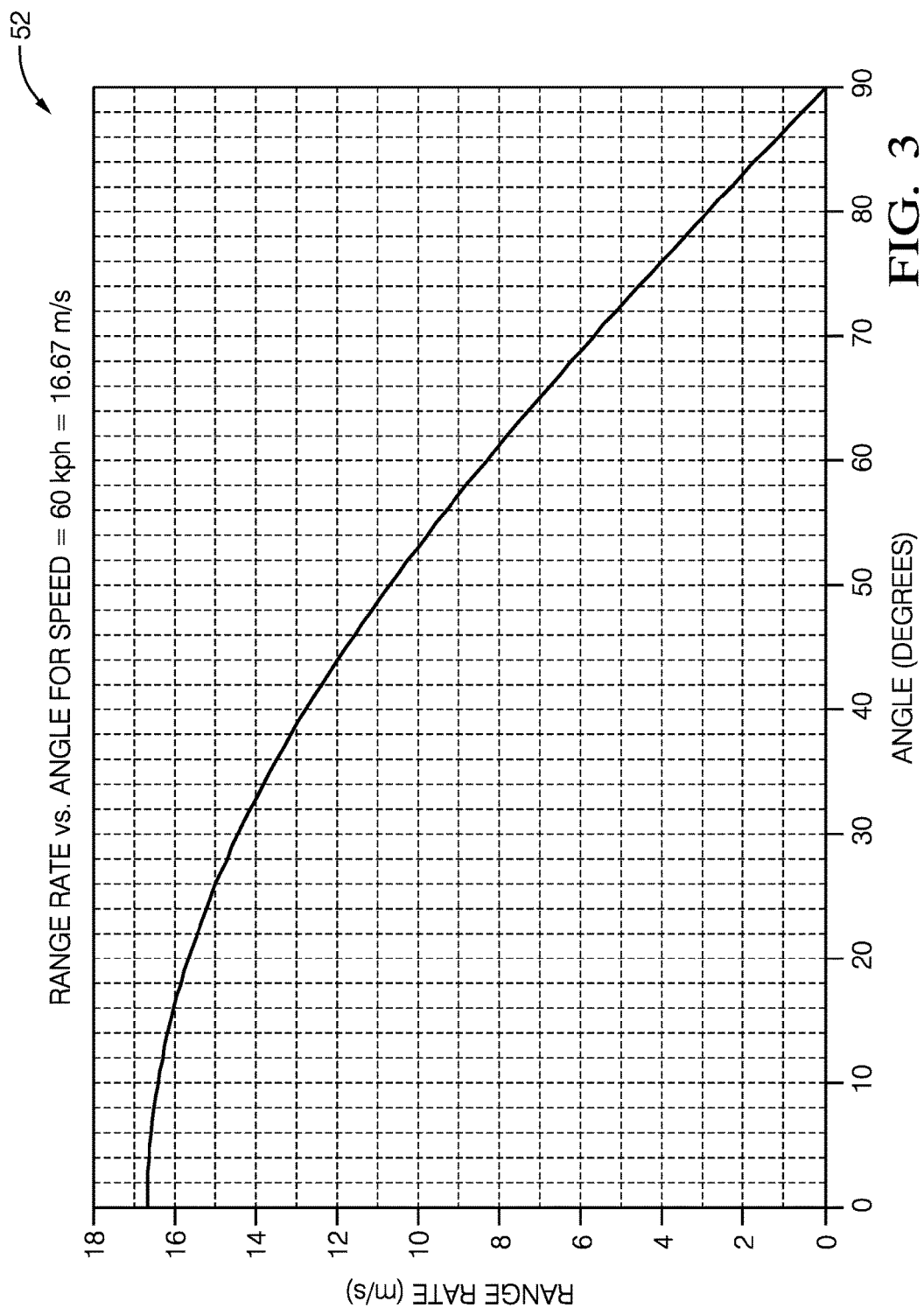
FIG. 3 is a graph of an ideal-response of the system of FIG. 1 in accordance with one embodiment.

FIG. 3 is a graph that illustrates a non-limiting example of an ideal-response 52 of the system 10 for the range-rate 38 versus the angle 36. The ideal-response 52 corresponds to what the system 10 would determine if the system 10 were perfectly calibrated, and the host-vehicle 12 traveled on a straight road at a constant speed. It should be recognized that FIG. 3 corresponds to the cosine of the angle 36 multiplied by the speed 44, which in this instance is sixty kilometers-per-hour (60 kph) or sixteen and two-thirds meters-per-second (16.67 m/s). FIG. 3 is relevant because in another step the controller 40 selects an ideal-response 52 of angle versus range-rate based on the speed 44. That is, if the speed 44 is some value other than 60 kph, the ideal-response 52 is scaled accordingly. As will be explained in more detail below, the calibration of the system 10 is based on a comparison of the actual detections stored in Eq. 1 above to the ideal-response 52.

In another step the controller 40 determines a calibration-matrix 54 of the system 10 based on a difference between the plurality of detections 48 and the ideal-response 52 when the object 20 is stationary, where the difference is based on an angle difference between an indicated-angle 66 at an indicated-range-rate 60 and an ideal-angle at an ideal-range-rate indicated by the ideal-response 52 for the condition that the ideal-range-rate is equal to the indicated-range-rate 60. To this end, a set of steering vectors corresponding to idealized responses is defined by Eq. 2 and Eq. 3 that corresponds to the configuration of the antenna 22.

$$a(\theta) = \frac{1}{\sqrt{N}} \begin{bmatrix} 1 \\ e^{i(1)\phi} \\ \vdots \\ e^{i(N-1)\phi} \end{bmatrix}, \quad \text{Eq. 2}$$

where $$\phi = \frac{2\pi}{\lambda} d \sin(\theta). \quad \text{Eq. 3}$$

Then for each of the M angles of arrival, an N×M matrix composed of M steering columns for each of the angles is defined by Eq. 4.

$$A = [a_{\theta_1} \ldots a_{\theta_M}] \quad \text{Eq. 4}$$

For each of the angle of arrival, a complex multiplier that corresponds to an overall arbitrary gain and a phase is provided that helps further adjusts the response from those angle, which is shown below as Eq. 5 and is labeled the matrix Z.

$$Z = \begin{bmatrix} \lambda_1 & 0 & 0 \\ 0 & \ddots & 0 \\ 0 & 0 & \lambda_M \end{bmatrix}. \quad \text{Eq. 5}$$

In another step the controller 40 adjusts an indicated-angle 66 to a subsequent-object in accordance with the calibration-matrix 54. In Eq. 6 below, the calibration-matrix 54 (labeled C) acts upon a plurality of detections 48 (labeled X) that are associated with a subsequent-object 56, i.e. an object different from the object 20 that was used to determine the calibration-matrix 54, to be equal the ideal response 52 multiplied by a set of complex values that helps adjust the ideal response to that of the calibrated response. The resulting equation is $$CX = AZ \quad \text{Eq. 6.}$$

C and Z can both be determined by solving the following Eq. 7 which is an optimization problem solved by textbook minimization approach over all possible values of C and Z.

$$\min(CX - ZA) \quad \text{Eq. 7.}$$

Since it is an optimization problem, there may not be a unique solution. Note that the number of angles included in the measurement vector X does not need to be complete. As the column of X approaches the full set of angles, the more accurate the calibration-matrix 54 becomes. That is, once the calibration-matrix 54 is determined, the effect is that controller 40 adjusts an indicated-distance 58 and an indicated-range-rate 60 to the subsequent-object 56 in accordance with the calibration-matrix 54 to provide an adjusted-distance 62 and an adjusted-range-rate 64 that corresponds to the actual distance and range-rate to the subsequent-object 56.

As suggested above, it is recognized that other characteristics (other than being stationary) of the reflected-signal 30 reflected by the object 20 may be examined to determine if the object 20 is suitable to use for calibrating the system 10. By way of example and not limitation, an instance of the plurality of detections 48 associated with the object 20 may be used to determine the calibration-matrix 54 when a face-linearity 70 of the object 20 is less than a linearity-threshold 72. As used herein, the face-linearity 70 is a measure of how much variation in distance is indicated if multiple returns or targets are associated with the object 20. For example, if a road-sign such as a speed-limit-sign had multiple returns because the road-sign was so close that the angular resolution of the system could detect the same sign at more than one value of the angle 36, the distance 34 of those multiple returns could be compared. Since the road-sign is relatively flat, there would be little variation in the distance 34 for each of the returns. By contrast, if the object 20 where a parked-vehicle on the shoulder of the roadway, a returns corresponding to a tail-light reflector and a side-view mirror would have substantially different distances. Such a variation in distance could complicate the process of determining the calibration matrix, so the parked-vehicle would not be a preferred instance of the object 20 used for calibration of the system 10. If the linearity-threshold 72 were set to twenty centimeters (20 cm) for example, then the face-linearity 70 of the parked-vehicle would likely be greater than the linearity-threshold 72 so the parked-vehicle may not be a suitable object to use for calibration. However, the face-linearity 70 of the road-sign would likely be less than the linearity-threshold 72 so the road-sign may be a suitable object to use for calibration.

By way of further example, an instance of the plurality of detections 48 associated with the object 20 may be used to determine the calibration-matrix 54 when the distance 34 is less than a distance-threshold 74, fifty meters (50 m) for example. If the object 20 is too far away, e.g. greater than 50 m, the signal-to-noise ratio (SNR) of the return signal may be too low to provide a relatively consistent detection. Also, at such distance the host-vehicle 12 may need to travel a substantial distance before the angle 36 changes enough for the system 10 to detect a different value for the angle 36. As such, it may be preferable to only use objects that are closer than the distance-threshold 74. It may also be preferable to only use objects that are detected with a SNR above some threshold, and/or when the reflected-signal 30 has a signal-strength greater than some strength-threshold.

Figure 4:
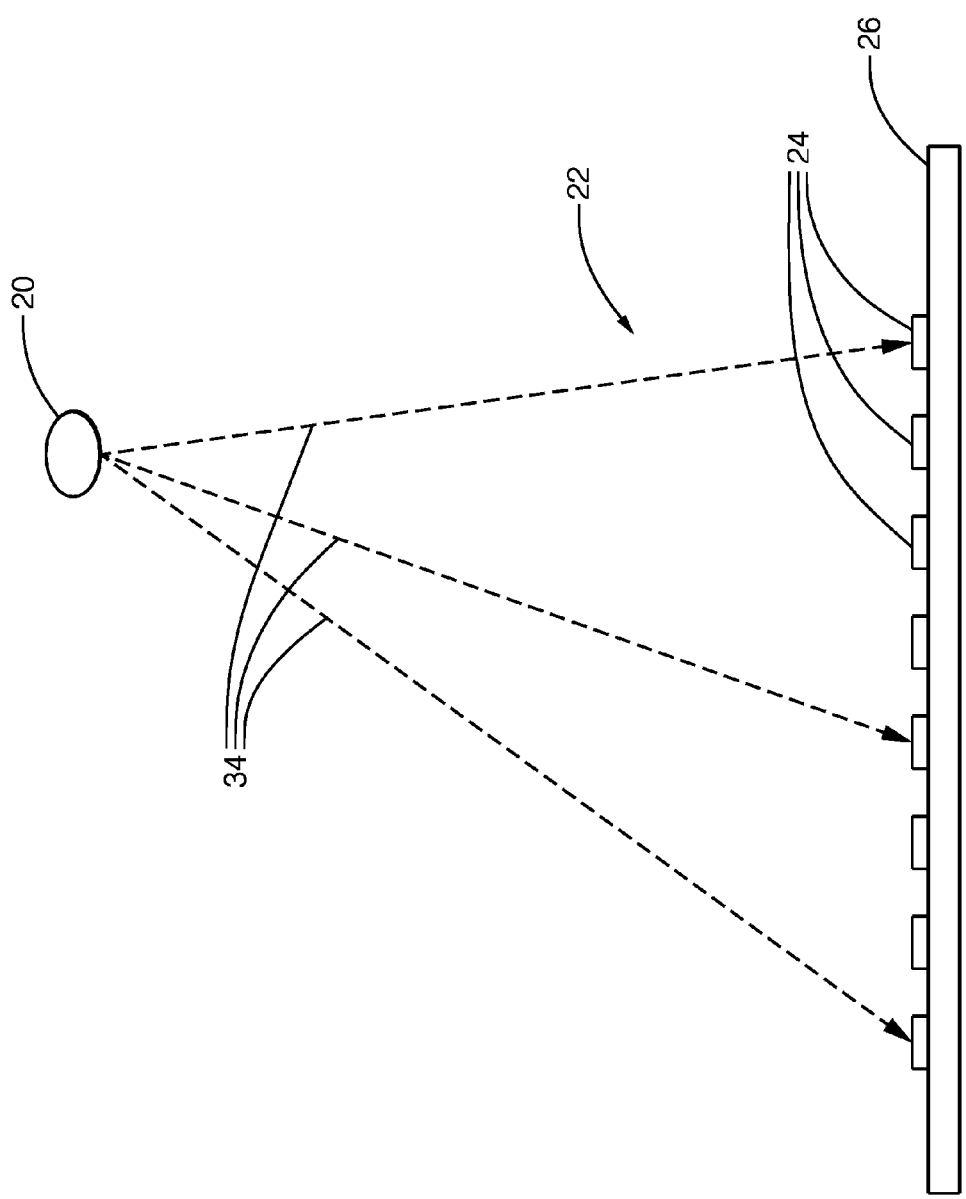
FIG. 4 is a top-edge view of an antenna used by the system of FIG. 1 in accordance with one embodiment.

FIG. 4 illustrates a non-limiting example of the antenna 22. As noted above, it is preferable if the antenna 22 includes a plurality of receive-elements 24 so that a direction (e.g. the angle 36) to the object 20 can be determined. While the illustration only shows three instances of the reflected-signal 30, this is only to simplify the illustration, and it is expected that typically all of the receive-elements 24 will receive or detect an instance of the reflected-signal 30. As such, each instance of the plurality of detections 48 includes complex-voltages 50 from each of the plurality of receive-elements 24. While the explanation above may be interpreted to suggest that the plurality of detections 48 are in the form of the distance, the angle 36, and the range-rate 38, it should be understood that this is conceptual to simplify the explanation of the system 10. The reality is that the plurality of detections 48 are typically in the form of the complex-voltages 50 received from each of the receive-elements 24, so it follows that the calibration-matrix 54 is configured to transform the complex-voltages 50 to correct or compensate for differences in the response of the system when compared to the ideal-response 52.

Accordingly, a radar system (the system 10), a controller 40 for the system 10, and a method of operating the system 10 is provided. The system 10 is an improvement over systems that are initially calibrated in a manufacturing environment, but do not have the ability to update and/or fine tune the calibration of the system 10 'on-the-fly' after the host-vehicle 12 has left the factory.

While this invention has been described in terms of the preferred embodiments thereof, it is not intended to be so limited, but rather only to the extent set forth in the claims that follow.

We claim:

1. A radar system comprising:
   an antenna mounted on a host-vehicle, wherein the antenna is used to broadcast a radar-signal and detect a reflected-signal arising from a reflection of the radar-signal by an object;
   a transceiver in communication with the antenna, wherein the transceiver determines a distance, an angle, and a range-rate of the object relative to the antenna based on the radar-signal and the reflected-signal; and
   a controller in communication with the transceiver, wherein the controller is configured to
   determine a speed of the host-vehicle;
   determine that the object is stationary based on the speed, the angle, and the range-rate;
   store in a memory a plurality of detections that correspond to multiple instances of the distance, the angle, and the range-rate as the host-vehicle travels by the object;
   select an ideal-response of angle versus range-rate based on the speed;
   determine, in response to a determination that the object is stationary, a calibration-matrix of the system for a plurality of angles of arrival to the antenna, said calibration-matrix based on a difference between the plurality of detections and the ideal-response; and
   adjust an indicated-angle to a subsequent-object in accordance with the calibration-matrix.

2. The system in accordance with claim 1, wherein the controller is configured to adjust an indicated-distance and an indicated-range-rate to the subsequent-object in accordance with the calibration-matrix.

3. The system in accordance with claim 1, wherein the difference is based on an angle difference between an indicated-angle at an indicated-range-rate and an ideal-angle at an ideal-range-rate equal to the indicated-range-rate.

4. The system in accordance with claim 1, wherein an instance of the plurality of detections associated with the object is used to determine the calibration-matrix when a face-linearity of the object is less than a linearity-threshold.

5. The system in accordance with claim 1, wherein an instance of the plurality of detections associated with the object is used to determine the calibration-matrix when the distance is less than a distance-threshold.

6. The system in accordance with claim 1, wherein the plurality of detections includes instances of the distance, the angle, and the range-rate from a plurality of objects.

7. The system in accordance with claim 1, wherein the antenna includes a plurality of receive-elements, and each instance of the plurality of detections includes complex-voltages from each of the plurality of receive-elements.

8. The system in accordance with claim 7, wherein the calibration-matrix is configured to transform the complex-voltages.

9. The system in accordance with claim 1, wherein the calibration-matrix comprises distinct correction factors for each of the plurality of angles of arrival.

10. The system in accordance with claim 1, wherein the plurality of angles of arrival in the calibration-matrix are defined by angle intervals between each of the plurality of angles of arrival.

11. A method comprising:
   broadcasting a radar-signal;
   detecting a reflection of the radar-signal by an object;
   determining a distance, an angle, and a range-rate of the object relative to an antenna used to detect the reflected-signal;
   determining a speed of a host-vehicle on which the antenna is mounted;
   determining that the object is stationary based on the speed, the angle, and the range-rate;
   storing in a memory a plurality of detections that correspond to multiple instances of the distance, the angle, and the range-rate as the host-vehicle travels by the object;
   selecting an ideal-response of angle versus range-rate based on the speed;
   determining, in response to determining that the object is stationary, a calibration-matrix for a plurality of angles of arrival to the antenna, said calibration-matrix based on a difference between the plurality of detections and the ideal-response; and
   adjusting an indicated-angle to a subsequent-object in accordance with the calibration-matrix.

12. The method in accordance with claim 11, wherein the method comprises
   adjusting an indicated-distance and an indicated-range-rate to the subsequent-object in accordance with the calibration-matrix.

13. The method in accordance with claim 11, wherein the difference is based on an angle difference between an indicated-angle at an indicated-range-rate and an ideal-angle at an ideal-range-rate equal to the indicated-range-rate.

14. The method in accordance with claim 11, wherein an instance of the plurality of detections associated with the object is used to determine the calibration-matrix when a face-linearity of the object is less than a linearity-threshold.

15. The method in accordance with claim 11, wherein an instance of the plurality of detections associated with the object is used to determine the calibration-matrix when the distance is less than a distance-threshold.

16. The method in accordance with claim 11, wherein the plurality of detections includes instances of the distance, the angle, and the range-rate from a plurality of objects.

17. The method in accordance with claim 11, wherein the antenna includes a plurality of receive-elements, and each instance of the plurality of detections includes complex-voltages from each of the plurality of receive-elements.

18. The system in accordance with claim 17, wherein the calibration-matrix is configured to transform the complex-voltages.

19. The system in accordance with claim 11, wherein the calibration-matrix comprises distinct correction factors for each of the plurality of angles of arrival.

20. The system in accordance with claim 11, wherein the plurality of angles of arrival in the calibration-matrix are defined by angle intervals between each of the plurality of angles of arrival.

* * * * *